July 9, 1940.　　　　B. ULINSKI　　　　2,207,688
INDUSTRIAL TRUCK
Filed Aug. 19, 1937　　　　6 Sheets-Sheet 1

July 9, 1940.  B. ULINSKI  2,207,688
INDUSTRIAL TRUCK
Filed Aug. 19, 1937  6 Sheets-Sheet 2

Inventor:
B. Ulinski

July 9, 1940.　　　　B. ULINSKI　　　　2,207,688
INDUSTRIAL TRUCK
Filed Aug. 19, 1937　　　6 Sheets-Sheet 3

Inventor:
B. Ulinski
By:
A. H. Golden
Atty.

July 9, 1940.  B. ULINSKI  2,207,688
INDUSTRIAL TRUCK
Filed Aug. 19, 1937  6 Sheets-Sheet 5

Inventor:
B. Ulinski
A. H. Golden
Atty.

July 9, 1940.    B. ULINSKI    2,207,688
INDUSTRIAL TRUCK
Filed Aug. 19, 1937    6 Sheets-Sheet 6

Inventor:
B. Ulinski
A. H. Golden
Atty.

Patented July 9, 1940

2,207,688

UNITED STATES PATENT OFFICE 2,207,688

INDUSTRIAL TRUCK

Bronislaus Ulinski, Chicago, Ill., assignor to The Yale & Towne Manufacturing Company, Stamford, Conn., a corporation of Connecticut Application August 19, 1937, Serial No. 159,824

38 Claims. (Cl. 214—113)

This invention relates to an electric industrial truck of the type adapted for moving heavy industrial loads.

Industrial trucks of the class including my invention are usually equipped with a main frame having a battery box containing a battery, a series of supporting wheels, and a power traction unit for driving certain of the wheels. In addition, there are present a pair of vertical uprights which are mounted for tilting, and are tilted by a power unit, called a tilting unit. On the uprights there is usually mounted a platform which moves up and down on the uprights through means of rollers, and is so moved by a third power unit, which is called a lifting unit. In addition, in trucks of especially heavy capacity, there will be a fourth power unit for steering the truck.

It is obvious that the presence of these various power units all on one truck, presents a problem in design. It is necessary that the several units be mounted effectively, and in such a manner that they will be readily accessible, simple to assemble and install, and economical of space. As one of the salient features of my invention, I have conceived and developed highly desirable mountings for my various power units.

Broadly, this particular feature of my invention comprises the mounting of a particular power unit so that it is pivotally supported on the axis of a power shaft driven by it. To absorb the torque tending to rotate the unit about the said shaft when power is applied to the shaft, I have a connection between the unit and the main frame of the truck. Thus, my traction unit is mounted on the axis of its drive shaft, and the torque is accepted by an arm between the traction unit and the main frame. Similarly, my tilting unit is mounted about the axis of the shaft through which it transmits its power, and its torque tending to rotate it about the axis of the said shaft is accepted by an arm extending from the tilt power unit to the main frame of the truck.

Since trucks of the particular type are used in narrow aisles in industrial plants, it is extremely desirable to employ a steering system through which sharp turns may be made. At the same time, the wheels should be mounted to follow a rough terrain. The steering system of my truck includes a pair of rear steering wheels which are supported for sharp turning, and also for extremely easy turning, while adapted also to follow changes in the contour of the terrain traversed by the truck. Thus, each of the rear steering wheels is carried by a fork which is pivoted about an axis passing diametrically and centrally through the particular wheel carried by said fork. The member on which the forks pivot is in turn pivoted to the truck main frame. The arrangement of my steering wheels and the entire steering system is of extreme importance as a contribution to this art. The power steer which I illustrate in my drawings is covered in a separate application for patent, Serial No. 143,912, filed May 21, 1937.

As a further feature of my invention, I have arranged for a novel mounting of my vertically moving platform, so that it may be lifted to an extremely high position relatively to the uprights. The details of this contribution will be set forth clearly in the specification.

As has already been indicated rather generally, trucks of the particular type employ so many different power units and so many different mechanisms, that the problem of properly assembling those units in a small industrial truck is extremely serious. An extremely novel feature of my invention resides in the mounting of the power transmitting means actuated by the various power units, such as the sprockets for actuating the chains which lift the vertically moving platform. I prefer to mount these sprockets on the axis of the traction drive shaft. Actually, these sprockets are mounted on sleeve extensions surrounding the drive shaft. This feature, and also the feature that the uprights are also supported for tilting movement about the axis of the drive shaft, contribute substantially to the value of this invention.

Still a further feature of my invention is the rather novel means which I have devised for absorbing any slack which may develop in the chain used for elevating and lowering the vertically moving platform. In describing my invention in detail, other important features thereof will be pointed out.

I have just described generally the various contributions to the art contained in my invention and which are to be described in detail hereinafter, so that the detailed description of my invention which follows will be more readily understood. Before proceeding with the detailed description of my invention, I should like to indicate, however, that since the principles of my contributions to the art may be embodied in a number of different specific forms, I do not wish to be limited in my patent monopoly to the construction and details to be described hereinafter. I desire, rather, that my patent monopoly protect me against the utilization of the principles of my invention by others in specific forms different from those herein set forth.

I shall now refer to the drawings wherein Fig. 2 is a plan view of the truck of Fig. 1, while Fig. 3 is an elevation and partial section of the rear wheel steering unit shown in Fig. 2.

Figure 1:
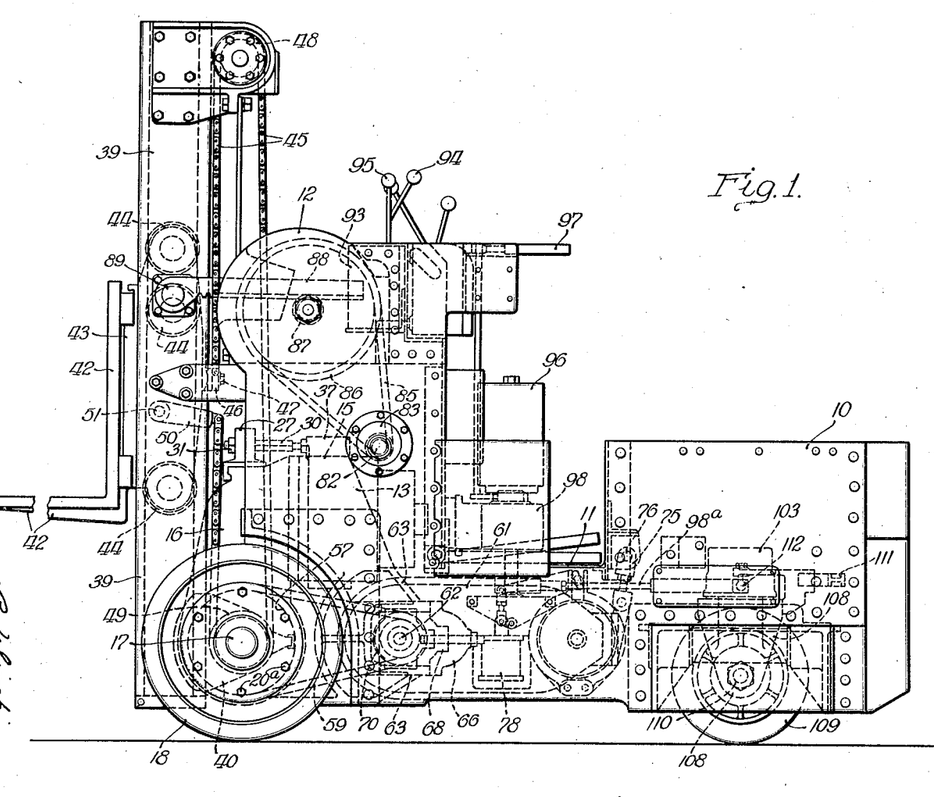
Fig. 1 is a side view of a truck embodying my invention.
Figures 2, 3:
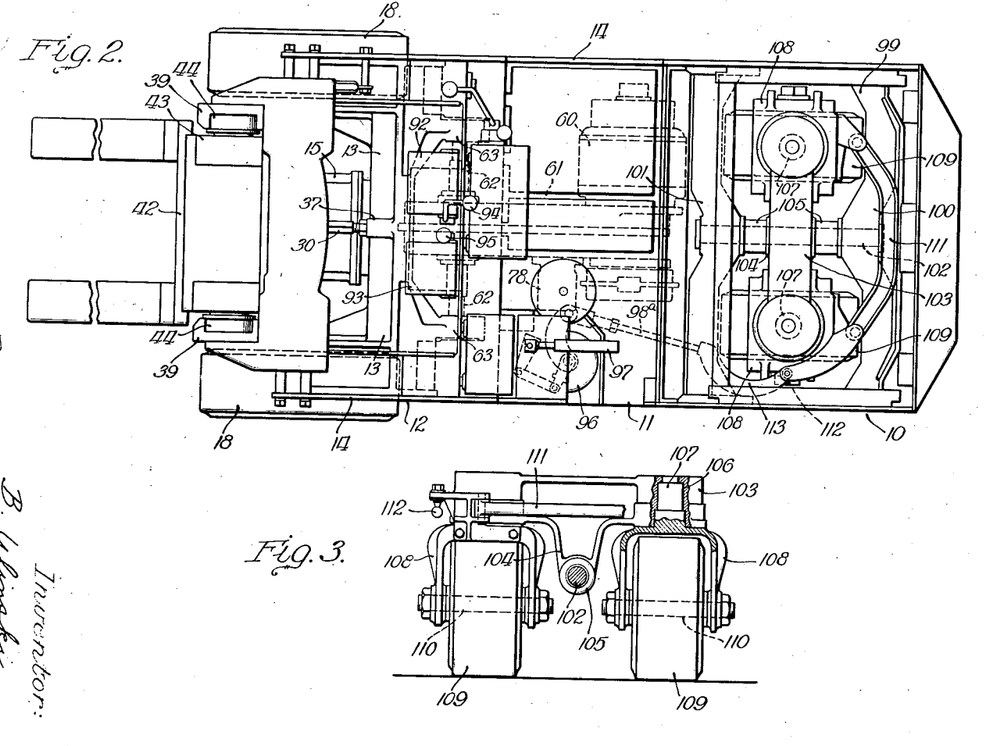

Referring now more particularly to the drawings and especially to Figs. 1 and 2, my truck embodies a main frame having a rear portion 10, a medial lowered portion 11 in the form of a platform on which the truck operator may stand, and a forward raised portion 12. It is the forward portion 12 which carries an important portion of the main frame called by me a cross frame member, designated by reference numeral 13 in Figs. 4 and 5. This cross frame member is so secured to the portions extending from the side main plates 14 of the truck that it may be considered integral with the said side main plates.

Having now set forth the general construction of the main frame, I shall first describe the traction unit of my invention.

Figures 7, 9:
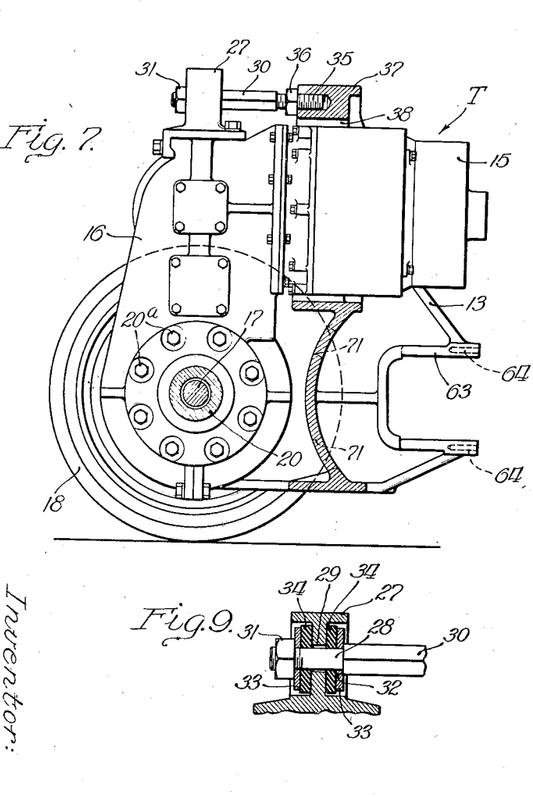
Fig. 7 is an elevation and partial section of the traction unit of my invention, illustrating its relation to the cross frame member.
Fig. 9 shows in section the details of the mounting of the contacting bar extending from the traction unit to the cross frame member.
Figure 8:
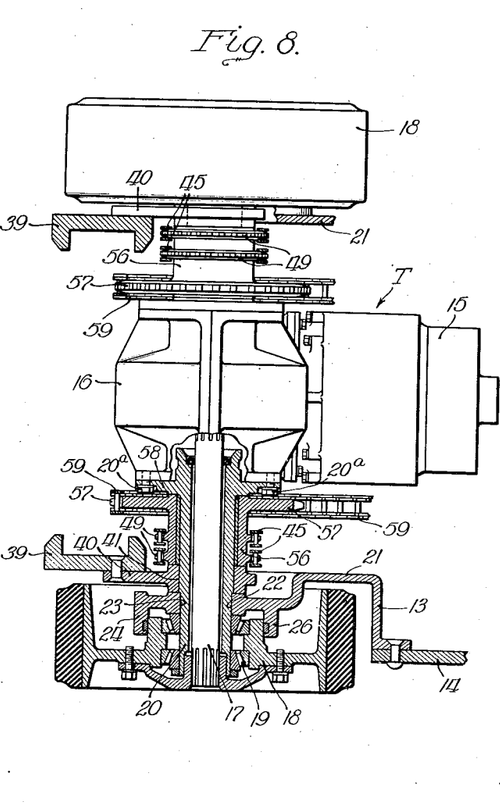
Fig. 8 is a partial section of the mechanism of Fig. 7 taken from a point below Fig. 7 looking upwardly.

This traction unit is designated generally by the letter T, and is best shown in Figs. 7 and 8, although its relation to the truck is well set forth in Fig. 1. The traction unit comprises a motor housing 15 which contains a suitable electric motor, which through a suitable set of gears contained in the gear box 16 drives the horizontally extending drive shaft 17 to which are secured each of the wheels 18, as is probably best illustrated in Fig. 8. While the wheels 18 are driven by the drive shaft 17, they are preferably each mounted for rotation through roller bearings 19 about what I shall term sleeves 20 which surround the drive shaft 17.

The two drive sleeves 20, one extending from each side of the gear box 16, are secured to the lower end of the gear box by a series of bolts 20a. At their opposite ends, the sleeves 20 are held assembled relatively to the main frame through the cross frame member 13 already described. This cross frame member 13 has a pair of extensions 21 (Fig. 5), each having a bearing portion 22 formed thereon. Each of these bearing portions 22 has a related bearing portion 23 formed on a removable bearing 24, each of the laterally extending drive sleeves being secured to the cross frame member through the fastening of bearing 24 to extension 21 by bolts 25. It is in this manner that the traction unit is secured in position to the main frame. As will be noted in Fig. 8, each of the wheels 18 is properly supported on its drive sleeve 20 through bearings 19, and is further held in position by a laterally extending portion 26 of each of the portions 21 of the cross frame member 13.

With the traction unit secured through drive sleeves 20 relatively to the main frame, and with the wheels 18 in position on the sleeves 20 and splined to the drive shaft 17, it is quite obvious that actuation of the motor unit 15 will drive the shaft 17 and wheels 18, provided some means are present to absorb the torque tending to rotate the traction unit about the axis of drive shaft 17 and the sleeves 20.

To this end, there is secured to the upper end of the gear box 16 an ear 27 constructed as is best shown in Fig. 9. The small threaded end 28 of a shaft 30 extends through an opening 29 in the ear 27, as is shown in Fig. 9, and is secured to the ear 27 through a nut 31 mounted on said threaded end. The nut 31 cooperates with the shouldered portion 32 of the shaft 30, a pair of metal washers 33, and a pair of rubber disks 34, as is clearly shown. It will be appreciated that because of the particular mounting, the rubber disks 34 will absorb any vibration between the shaft 30 and the traction unit ear 27. The end of the shaft 30 opposite end 28 is threaded as at 35, and is secured through the said threads and a locking nut 36 to a threaded lug 37 integral with the cross frame member 13.

At this point, it should be indicated that the cross frame member 13 has an opening 38 through which extends the motor housing 15 of my traction unit. It will now be readily appreciated that the power generated by the motor of the power unit will drive the shaft 17 transmitting motion to the wheels 18, the torque thus developed about the drive shaft 17 being accepted by the shaft 30 connected to the main frame through cross frame 13, and with the vibration incidental to said acceptance of the torque being absorbed by the rubber disks 34.

Having now described the mounting of my traction unit, I shall describe the mounting of the tilting uprights. These uprights are of the usual familiar form known to the art, their sectional shape being best shown in Figs. 2 and 8, wherein the uprights are designated by reference numeral 39. Secured to each of the uprights 39 as by riveting or welding, is a bearing sector 40, this bearing sector being bored out as at 41 for mounting about the drive sleeve 20, as is probably best illustrated in Figs. 6 and 8. Because of this particular construction, it is readily observed that each of the uprights 39 will readily tilt about a drive sleeve 20. The upright bearing portions 40 are confined on the sleeves 20 at one side by a surface of the cross frame member 21 and removable bearing 24, and by a sleeve 56 on the other side.

Figure 12:
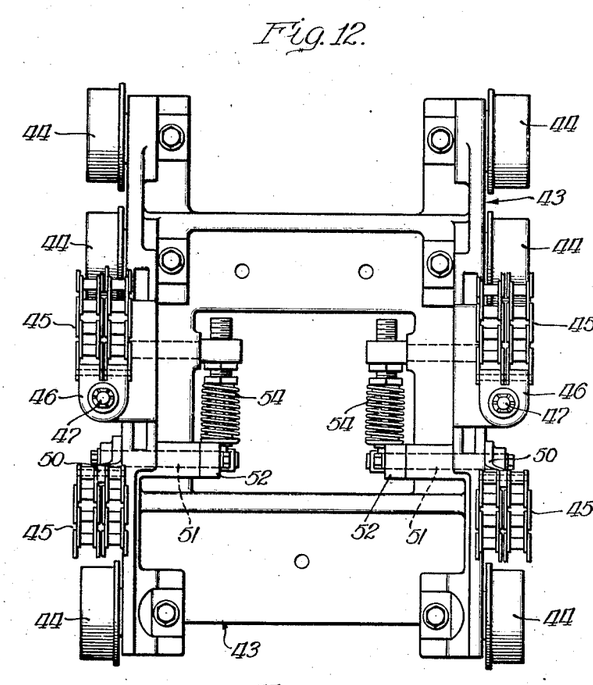
Fig. 12 is an elevation of the vertically moving load platform.
Figure 13:
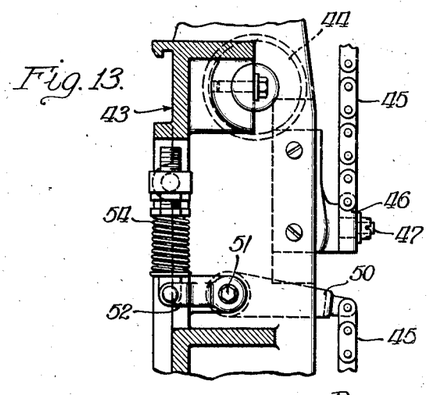
Fig. 13 is an end view and partial section of a portion of Fig. 12 illustrating the method of connecting the lift chain to the elevating platform.

Mounted for vertical sliding movement on the uprights 39 is a fork platform 42 carried by a vertically sliding carriage 43, best illustrated in Fig. 12. Naturally, any other type of platform or load carrier may be used. This carriage 43 has mounted on each side thereof a series of three rollers 44 which lie between the flanges of the channels forming the vertical uprights 39. As a matter of fact, a pair of rollers 44 on each side of the carriage 43 would be quite sufficient for guiding the said carriage 43 in its up and down movement. However, circumstances arise where a higher lift than is generally necessary may be required for emergency operation. In just such a case, the carriage 43 may be elevated on the uprights 39 to a point wherein the upper rollers 44 are positioned beyond the uprights 39 so that the carriage will then be supported only by the lower pairs of rollers 44. Because of this construction, an emergency operation is possible without effecting in any way the ordinary operation of the vertically moving carriage 43.

For moving the carriage 43 up and down on the uprights 39, I utilize two pairs of chain members, one pair operating on one side of the carriage 43, while the other pair cooperates with the other side of the carriage 43 to yield a more uniform lifting action. Only one pair of chains will be described here. This pair is designated by reference numeral 45, and carries at one end thereof a link 46 which through a bolt 47 is secured to the carriage 43. This said pair of chains extends upwardly from its point of fastening by bolt 47, as is best illustrated in Fig. 1, over a pair of sprocket wheels 48 supported by uprights 39, then downwardly over a pair of sprocket wheels 49, then upwardly to the carriage 43, where they are secured to the end of a lever 50.

Figure 14:
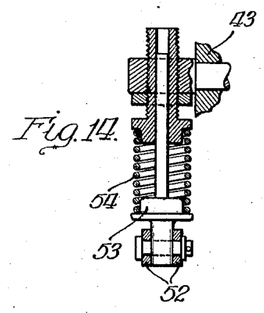
Fig. 14 is a detail of a portion of Fig. 13.

This lever 50 is integral with a pivot shaft 51 extending through the carriage 43 and carrying on its opposite end a lever 52. This lever 52, through a cup member 53 (Fig. 14) is spring pressed downwardly by a spring 54, and tends to move the lower end of the chain 45 upwardly so as to absorb any slack in the said chain 45. While means for absorbing slack in a chain in a combination of the present type are known in the art, the specific means I have conceived and herein disclosed are of such value and operate so effectively, that I wish my patent monopoly to be extended thereto.

It will now be appreciated that when motion is transmitted to each of the pairs of chains 45 through the lower pairs of sprockets 49, shown in Fig. 8, the pairs of chains will act to move the carriage 43 upwardly or downwardly, as the case may be, to elevate the fork platform 42, the slack in the chain being absorbed by the springs 54.

In describing the lifting of the carriage 43, I pointed out that each pair of chains 45 is arranged to travel over and to be actuated by a pair of sprockets 49. It should now be indicated that these sprockets 49 are integral with sleeve 56 on which is also formed a third sprocket 57 of considerably larger size than the sprockets 49. Each sleeve 56 rotates freely about its drive sleeve 20, and is of such length as to occupy all of the space between the bearing portion 40 of the tilting uprights 39, and a horizontal flange 58 extending from the drive sleeve 20, as is best shown in Fig. 8. At this point, it will simply be indicated that the sprocket 57 is driven by a chain 59, and thus transmits motion to the sprockets 49, which in turn through chains 45 actuate the vertically moving carriage 43, as has already been indicated.

Figures 4, 5, 6:
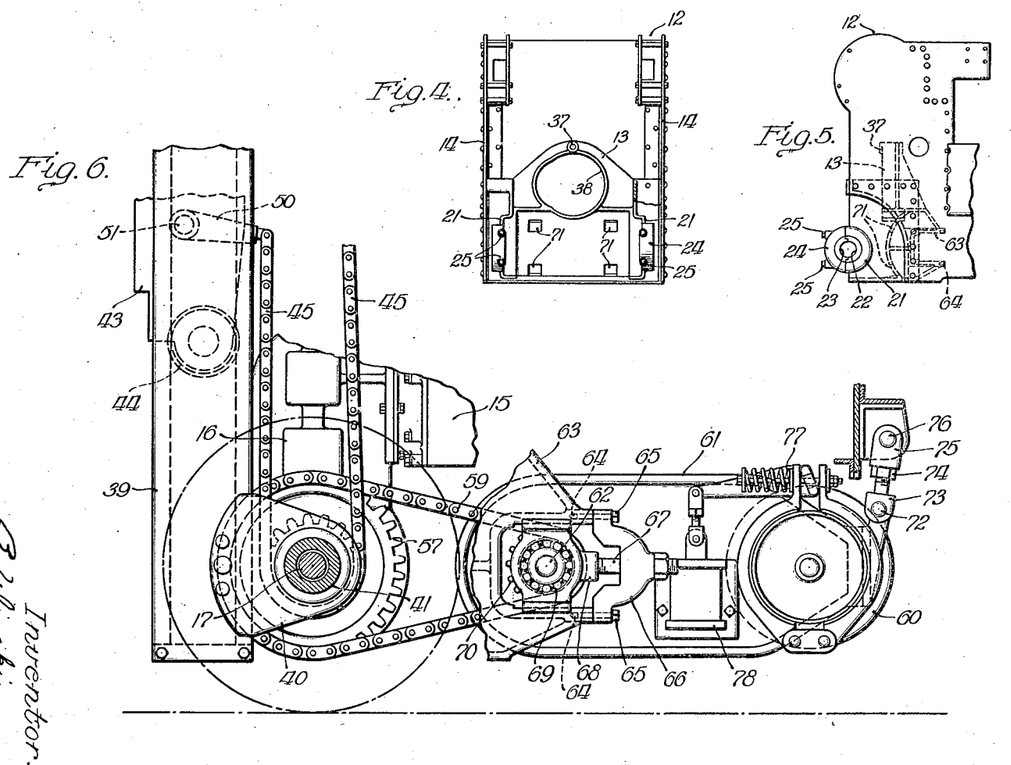
Fig. 4 is an end view of the main frame of the truck, showing the mounting of a cross frame member relatively to the main side plates of my truck.
Fig. 5 is a side view of the forward portion of the main frame of my truck illustrating the mounting of the cross frame member referred to in describing Fig. 4.
Fig. 6 illustrates in detail the mounting of the platform lift unit, as it will be called, and the transmission of the power from said lift unit to the elevating platform.

I shall now describe the means for actuating each of the chains 59 and the sprockets 57 for elevating the carriage 43. The unit which drives each chain 59 is termed a lift unit, and is best shown in detail in Fig. 6, although its relation to the main frame of the truck is well shown in Fig. 2. Referring now to Figs. 2 and 6, the lift unit comprises a motor 60 which through a set of gears contained in a gear box 61, drives a shaft 62. The cross frame member 13 has a bracket 63, probably best shown in Figs. 6 and 7, which is drilled and tapped as at 64 for cooperation with a pair of bolts 65, which secure to the bracket 63 a tilting unit supporting bracket 66.

This bracket 66 through the shaft 67 secured thereto supports a bearing member 68 carrying a ball bearing 69 for mounting in rotatable relation the drive shaft 62. This drive shaft 62 carries a pair of sprockets 70 which drive the chains 59. As has already been indicated, it is the chains 59 which drive the sprockets 57 which in turn, because they are each integral with the sleeves 56 carrying sprockets 49, drive the lift chains 45. At this point, it is well to indicate that each of the chains 59 driven by the pairs of sprockets 70 carried on the shaft 62 traverses a pair of holes 71 formed in a part of the cross frame member 13, as will be quite apparent.

For completing the support of the lift unit, one end of the gear box 61 has secured thereto as by pin 72, a link 73, which is adjustable through a nut 74 and carries a fork 75 pinned at 76 to the main frame. The lift unit is also shown with the usual solenoid brake 77 actuated by the solenoid 78, these parts being of a usual type well known in the art, and therefore not requiring any further detailed explanation.

It will be well at this time to analyze briefly the construction so far described. It will be quite evident that a traction unit comprising a drive shaft and sleeves, is mounted about the axis of the drive shaft on the main frame of the track. The only other connection between the traction unit and the main frame is means for absorbing the torque incidental to the transmission of tractive effort to the traction wheels. It will also be remembered that the tilting uprights are mounted for rotation about the axis of the drive shaft, and that the sprockets for driving the chains which actuate the lifting carriage are also mounted for rotation on the axis of the drive shaft. As for the lift unit, it is supported on its drive shaft, and a torque link connects it to the main frame.

I shall now describe the mounting of the tilt unit and the manner in which the tilt unit tilts the uprights. The tilt unit is probably best shown in Figs. 10 and 11, and as there shown comprises an electric motor 79, gear boxes 80 and 81 containing gears, and a drive shaft 82 actuated by the motor through the gears in boxes 80 and 81. This drive shaft 82 is supported at its opposite ends in adjustable bearings 83 and carries a sprocket 84 at each of its opposite ends for driving a chain 85, each chain in turn driving a sprocket wheel 86 integral with a pinion 87. Each pinion 87 in turn drives a rack 88 which is pivoted at 89 to the uprights 39. It will now be quite readily appreciated that rotation of shaft 82 through operation of the motor 79 will through sprockets 84, 85 and 86, drive the pinions 87, which through racks 88 will tilt the uprights 39 into any position which may be desired.

Figures 10, 11:
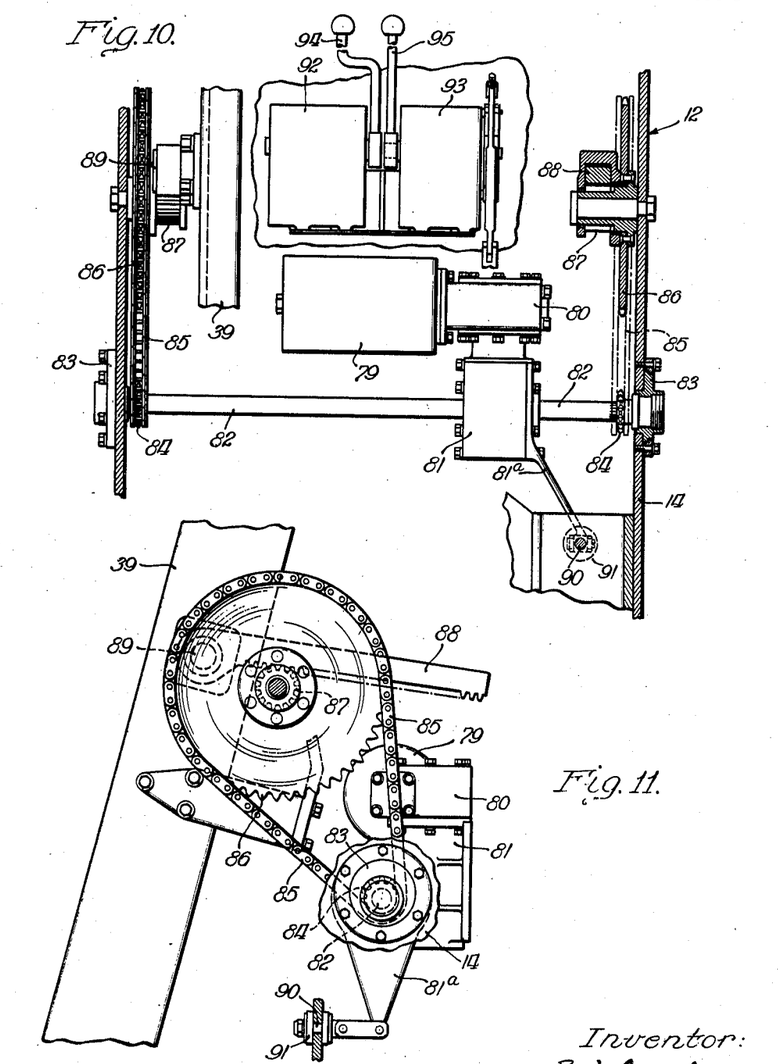
Fig. 10 is an elevation and partial section illustrating the mounting of the unit for tilting the uprights of my invention, this unit being called the tilt unit.
Fig. 11 is an elevation and partial section illustrating also the operation of the tilt unit.

As is quite readily seen in Fig. 11, the entire tilt unit is supported on the shaft 82. For absorbing the torque which is developed by the tilt unit tending to rotate it on the axis of the shaft 82, there extends from gear box 81 an arm 81ª which is secured through a pin 90 to the frame of the truck as at 91, the principle involved being the same as that described with regard to Fig. 7, in which the means for absorbing the torque of the traction unit were described.

In addition to the mechanism just described, Fig. 10 shows also a pair of controllers 92 and 93, and operating levers 94 and 95. These controllers are used for controlling the various electric motors which have been described, all of which will be readily appreciated by those skilled in the art. These controllers are positioned above and in front of the lower medial portion 11 of the main frame so as to be readily operable by a man occupying the truck platform. Naturally, there is a controller for each power unit which has so far been described, and an additional controller for the power steering mechanism which is shown in this application, but which is not described in detail or claimed since it forms the subject of an additional application, as has already been set forth.

For purposes of clarity, it should be indicated, however, that the power steering motor is designated by reference numeral 96 in Figs. 1 and 2, and is controlled by a controller through handle 97. The motor 96 operates through a gear box 98 to steer the truck through a connecting link 98ª, as is best illustrated in Fig. 2. This brings us to the novel steering and load supporting wheels forming part of my invention.

The rear portion 10 of my main frame has a pocket 99 formed therein, the upper portion of this pocket being arranged for the mounting of a battery which forms the power source for the various power units herein described. This mounting of the battery is important, since it acts to counterbalance the load placed on the forks at the opposite end of the truck. The lower half of the pocket 99 contains longitudinally spaced bearing portions 100 and 101 which support a bearing shaft 102. A cross beam member 103 has a medial downwardly extending portion 104 (best illustrated in Fig. 3) carrying a relatively long sleeve portion 105, through which passes the bearing shaft 102. In this way, the cross beam member 103 is supported for pivotal movement relatively to the main frame about the longitudinal bearing shaft 102.

The beam 103 is bored at each of its opposite ends at 106, as is illustrated in Fig. 3, for the insertion of a vertical shaft portion 107 of a wheel supporting fork 108. Each wheel supporting fork 108 carries a steering wheel 109 about a shaft 110, the wheel 109 and fork 108 being together rotatable about the vertical shaft 106, and thus about an axis passing centrally and diametrically through each wheel 109.

Because of the particular mounting of the wheels 109, it is readily seen that they may move to a position practically at right angles to their position of Fig. 2, so that the truck may steer very sharply. The two forks 108 are connected by means of a steering link 111 and a steering knuckle 112 to a further link 113, in turn connected to the link 98ª. In this way, the wheels 109 are steered by the steering motor 96. Naturally, the wheels 109 may be steered just as effectively by a hand power device, should it be desired to do so.

I now claim:

1. In a truck of the class described, a pair of uprights, a platform adapted for vertical sliding movement on said uprights, three rollers carried on each side of said platform and spaced vertically of said platform for cooperation with said uprights to guide and support said platform on said uprights, the said platform being movable from a low position in which all three rollers on each side of said platform are engaged with said uprights to a high position in which only the two lower rollers on each side of said platform engage said uprights, said two lower rollers supporting and guiding said platform until the platform is lowered once again so that said upper rollers engage the uprights.

2. In a truck of the class described, a pair of uprights each having a channel, a platform adapted for vertical sliding movement on said uprights, three rollers carried on each side of said platform and riding in the channels of said uprights for guiding said platform in its vertical movement, the said platform being movable from a lower position in which all three rollers are in said channel to an upper raised position in which only the two lower rollers on each side of the platform are in said channel, said two lower rollers supporting and guiding said platform until it is lowered once again to enter the upper of said rollers in said channel.

3. In a truck of the class described, a pair of uprights each having a channel, a platform adapted for vertical sliding movement on said uprights, a plurality of rollers carried on each side of said platform riding in the channels of said uprights for guiding said platform in its vertical movement, the said platform being movable from a lower position in which all the rollers are in said channel to an upper raised position in which only the two lower rollers on each side of the platform are in said channel, said two lower rollers supporting and guiding said platform until it is lowered once again to enter the upper of said rollers in said channel.

4. In a truck of the class described, a pair of uprights, a platform adapted for vertical sliding movement on said uprights, a plurality of rollers carried on each side of said platform and spaced vertically of said platform for cooperation with said uprights to guide and support said platform on said uprights, the said platform being movable from a low position in which all the rollers on each side of said platform are engaged with said uprights to a high position in which only the lower rollers on each side of said platform engage said uprights, said two lower rollers supporting and guiding said platform until the platform is lowered once again so that said upper rollers engage the uprights.

5. In a truck of the class described, a main frame, a pair of uprights, means mounting said uprights for tilting movement, a tilt unit comprising a motor and an actuating shaft rotated by said motor, bearings carried by said main frame for portions of said actuating shaft whereby said tilt unit is pivotally supported by said bearings on the axis of said shaft, means operated by rotation of said shaft for tilting said uprights, and means between said main frame and tilt unit for accepting the torque incidental to the rotation of said shaft by said tilt unit motor.

6. In a truck of the class described, a main frame having a pair of vertical parallel main plates, a pair of uprights, means mounting said uprights for tilting movement, a tilt unit comprising a motor and an actuating shaft rotated by said motor, bearings on said pair of vertical main plates for the opposite ends of said actuating shaft whereby said tilt unit is pivotally supported on said main frame on the axis of said shaft, means operated by rotation of said shaft for tilting said uprights, and means between said main frame and tilt unit for accepting the torque incidental to the rotation of said shaft by said tilt unit motor.

7. In a truck of the class described, a drive unit comprising a drive axle, a chain sprocket mounted for free rotation about said drive axle, a lifting chain mounted on said sprocket, and a lift unit for rotating said sprocket.

8. In a truck of the class described, a drive unit comprising a drive axle, a chain sprocket mounted for free rotation about said drive axle, a lifting chain mounted on said sprocket, a second sprocket fixed to said first sprocket and also mounted for rotation about said drive axle, a lifting unit, and a chain driven by said lifting unit for rotating said second sprocket.

9. In a truck of the class having a pair of vertical uprights, a platform movable on said uprights, a chain for moving said platform on its uprights, a traction unit comprising a drive axle, and a sprocket for actuating said chain mounted for rotation about said drive axle.

10. In a truck of the class having a pair of vertical uprights, a platform movable on said uprights, a chain for moving said platform on its uprights, a traction unit comprising a horizontally extending drive axle, a hollow shaft surrounding each end of said drive axle, a traction wheel mounted for rotation at the ends of said hollow shafts and driven by said drive axle, and a sprocket for actuating said chain mounted for rotation on said hollow shaft.

11. In a truck of the class having a pair of vertical uprights, a platform movable on said uprights, a chain for moving said platform on its uprights, a traction unit comprising a horizontally extending drive axle, a hollow shaft surrounding each end of said drive axle, a traction wheel mounted for rotation at the ends of said hollow shafts and driven by said drive axle, a sleevelike element rotatable on said hollow shafts, a pair of sprockets on said sleevelike element one of said sprockets actuating said chain for lifting the platform, a power lift unit, and a chain driven by said power lift unit and in driving engagement with the other of said pair of sprockets.

12. In a truck of the class having a pair of vertical uprights, a platform movable on said uprights, a chain for moving said platform on its uprights, a traction unit comprising a shaft extending transversely of the truck, means mounting the said uprights for rotation on the axis of said shaft, traction wheels mounted for rotation by said shaft, and a sprocket for actuating said chain for lifting the platform also mounted on the axis of said shaft.

13. In a truck of the class described, a pair of uprights, a platform movable vertically on said uprights, a chain for imparting movement to said platform, means fixing one end of said chain to said platform, a lever pivoted to said platform, the other end of said chain being secured to said lever on one side of its pivot, a spring mounted in position on the other side of said pivot and tending to rotate the said lever about its pivot in a direction to absorb the slack in said chain.

14. In a truck of the class described, a main frame, a pair of uprights, means mounting said uprights for tilting movement, a tilt unit comprising a motor and an actuating shaft rotated by said motor, bearings on said main frame for the opposite ends of said actuating shaft whereby said tilt unit is pivotally supported on said main frame on the axis of said shaft, and means between said main frame and tilt unit for accepting the torque incidental to the rotation of said shaft by said tilt unit motor.

15. In a truck of the class described, a main frame having parallel spaced main plates, an operating unit comprising power and drive mechanism and an actuating shaft adapted to be rotated by said power and drive mechanism, bearings, in said parallel spaced main plates for the opposite ends of said shaft whereby said shaft supports said unit on said main frame, and means of connection between said unit and main frame for absorbing the drive torque of said unit about said shaft.

16. In a truck of the class described, a main frame, a pair of uprights, means mounting said uprights for tilting movement, a tilt unit comprising a motor and an actuating shaft, bearings on said main frame for the opposite ends of said actuating shaft whereby said tilt unit is pivotally supported on said main frame on the axis of said shaft, a pair of pinions driven by said shaft, and racks carried by said uprights cooperable with said pinions to tilt said uprights.

17. In a truck of the class described, a main frame, a traction unit having horizontally extending portions whereby it is supported by said main frame, tilting uprights, and means mounting said uprights for tilting about the axis of said horizontally extending portions of the traction unit.

18. In a truck of the class having a pair of vertical uprights, a traction unit comprising a shaft extending transversely of the truck, means mounting the said uprights for rotation on the axis of said shaft, and traction wheels mounted for rotation by said shaft.

19. In a truck of the class described, a main frame, a traction unit including a traction axle and traction wheels, a housing for said traction unit and whereby said unit is secured to said main frame, a pair of tilting uprights, and bearings formed on said housing for supporting said tiltings uprights for tilting movement.

20. In a truck of the class described, a main frame, a traction unit including a traction axle and traction wheels, a housing for said traction unit and whereby said unit is secured to said main frame, a pair of tilting uprights, and bearings formed on the exterior surface of said housing for supporting said tilting uprights for tilting movement.

21. In a truck of the class described, a main frame, a traction unit including a traction axle and traction wheels, a housing for said traction unit and whereby said unit is secured to said main frame, a pair of tilting uprights, and bearings formed on the exterior surface of said housing and coaxial with said axle for supporting said tilting uprights for tilting movement.

22. In a truck of the class described, a main frame, tilting uprights, means mounting said uprights for tilting about a predetermined axis relatively to said main frame, an elevating platform mounted for vertical movement on said uprights, and means for effecting the lifting of said platform rotatably mounted about the same axis as said uprights.

23. In a truck of the class described, a main frame, a traction unit and its housing supported on said main frame and having a traction axle, tilting uprights, means mounting said uprights for tilting about said housing, an elevating platform mounted for vertical movement on said uprights, a chain drive for said elevating platform and a sprocket for said chain drive about said housing and on the axis relatively to which said uprights tilt.

24. In a truck of the class having a pair of vertical uprights, a platform movable on said uprights and a chain for moving said platform on its uprights, a traction unit comprising a horizontally extending drive axle, a housing surrounding said drive axle, a traction wheel mounted for rotation at each end of said housing and driven by said drive axle, means mounting said vertical uprights for support and tilting movement on said housing, and a sprocket for actuating said chain mounted for rotation on said housing.

25. In a truck of the class having a pair of vertical uprights, a platform movable on said uprights, a chain for moving said platform on its uprights, a traction unit comprising a horizontally extending drive axle, a housing for said drive axle, a traction wheel mounted for rotation at each end of said housing and driven by said drive axle, means mounting said vertical uprights for support and tilting movement on said housing, a sleevelike element rotatable on said housing, a pair of sprockets formed on said sleevelike element, one of said sprockets being adapted to actuate said chain for lifting the platform, and a lift unit having a chain for driving the other sprocket.

26. In a truck of the class described, a main frame, a traction unit having a horizontally extending drive shaft, a housing encompassing said drive shaft, means securing the ends of said housing to said main frame, traction wheels mounted for rotation at each end of said housing and connected to said drive shaft to be driven thereby, a pair of uprights, means mounting said uprights on said housing for support and tilting movement relatively to said truck, a platform mounted for vertical movement on said uprights, a chain drive for said platform, and sprockets for the said chain drive mounted for rotation on said housing.

27. In a truck of the class described, a main frame, a traction unit having a horizontally extending drive shaft, a housing encompassing said drive shaft, means securing the ends of said housing to said main frame, traction wheels mounted for rotation at each end of said housing and connected to said drive shaft to be driven thereby, a pair of uprights, and means mounting said uprights on said housing for support and tilting movement relatively to said truck.

28. In a truck of the class described, a main frame, an operator's platform centrally located on said main frame, a traction unit at the front end of said truck and having a traction housing secured at its opposite ends to the front end of said main frame, a pair of uprights mounted for tilting at the front end of said truck, the main frame of said truck extending upwardly between said platform and the forward end thereof and in close relation to said uprights, a tilt unit secured to said upwardly extending main frame portion for tilting said uprights, an elevating platform mounted for sliding movement on said uprights, a chain drive for said platform, and a power unit under said operator's platform for actuating said chain drive.

29. In a truck of the class described, a main frame, an operator's platform centrally located on said main frame, a traction unit including a traction motor at the front end of said truck and having a traction housing secured at its opposite ends to the front end of said main frame, a pair of uprights, means whereby said uprights are mounted on said housing and are tiltable thereabout, the main frame of said truck extending upwardly between said platform and the forward end thereof and in close relation to said uprights, a tilt unit secured to said upwardly extending main frame portion for tilting said uprights, an elevating platform mounted for sliding movement on said uprights, a chain drive for said platform, and a power unit under said operator's platform for actuating said chain drive.

30. In a truck of the class described, a main frame, a traction unit supported on said main frame and having a traction axle, tilting uprights, means mounting said uprights for tilting about the axis of said traction axle, an elevating platform mounted for vertical movement on said uprights, and means for moving said platform rotatably mounted about the axis of said traction axle.

31. In a truck of the class described, a main frame, a traction unit supported on said main frame and having a traction axle, tilting uprights, means mounting said uprights for tilting about the axis of said traction axle, an elevating platform mounted for vertical movement on said uprights, a chain drive for said elevating platform and a sprocket for said chain drive also rotatable about the axis of said traction axle.

32. In a truck of the class having a pair of vertical uprights, a platform movable on said uprights and a chain for moving said platform on its uprights, a traction unit comprising a horizontally extending drive axle, a hollow shaft surrounding each end of said drive axle, a traction wheel mounted for rotation at the end of each of said hollow shafts and driven by said drive axle, means mounting said vertical uprights for support and tilting movement on said hollow shafts, and a sprocket for actuating said chain mounted for rotation on said hollow shafts.

33. In a truck of the class having a pair of vertical uprights, a platform movable on said uprights, a chain for moving said platform on its uprights, a traction unit comprising a horizontally extending drive axle, a hollow shaft surrounding each end of said drive axle, a traction wheel mounted for rotation at the end of each of said hollow shafts and driven by said drive axle, means mounting said vertical uprights for support and tilting movement on said hollow shafts, a sleevelike element rotatable on each of said hollow shafts, a pair of sprockets formed on each of said sleevelike elements, one of said sprockets being adapted to actuate said chain for lifting the platform, and a lift unit having a chain for driving the other sprocket.

34. In a truck of the class described, a main frame, a traction unit having a horizontally extending drive shaft, sleeves secured to said traction unit and encompassing said drive shaft, means securing the ends of said sleeves to said main frame, traction wheels mounted for rotation relatively to said sleeves and connected to said drive shaft to be driven thereby, a pair of uprights, means mounting said uprights on said sleeves for support and tilting movement relatively to said truck, a platform mounted for vertical movement on said uprights, a chain drive for said platform, and sprockets for the said chain drive mounted for rotation on said sleeves.

35. In a truck of the class described, a main frame comprising main side plates, an operator's platform centrally located endwise on said main frame and between said main side plates, a traction unit including a traction motor at the front end of said truck and having a traction housing secured at its opposite ends to the lower front ends of said main side plates, a pair of uprights, means mounting said uprights for tilting on the said traction unit housing, a tilt unit comprising a motor and housing and a driven shaft, a bearing on each of said main side plates located forwardly of said central platform portion, said bearings supporting the ends of said tilt unit shaft and therefore said entire tilt unit, means whereby the tilt unit torque is accepted by said main frame, and drive means juxtaposed to said main plates and extending between the ends of said tilt unit shaft and said uprights for tilting said uprights on said housing.

36. In a truck of the class described, a main frame, a pair of uprights, means mounting said uprights for tilting movement, a tilt unit comprising a motor and an actuating shaft rotated by said motor, means between said shaft and uprights whereby rotation of said shaft tilts said uprights, bearings carried by said main frame for portions of said actuating shaft whereby said tilt unit is pivotally supported relatively to said main frame on the axis of said shaft, and means between said main frame and tilt unit for accepting the torque incidental to the rotation of said shaft by said tilt unit motor.

37. In a truck of the class described, a main frame, a traction unit and its housing comprising a motor and gearing and a horizontally extending drive shaft, a sleeve surrounding each end of said drive shaft and forming part of the traction unit housing, mounting means on said main frame whereby it is assembled to said sleeves and therefore to said traction unit housing, traction wheels mounted at the ends of said sleeves and driven by said drive shaft, a pair of tilting uprights, and bearing means whereby said tilting uprights are mounted on said sleeves for tilting movement relatively to said main frame.

38. In a truck of the class described, a main frame, a traction unit and its housing comprising a motor and gearing and a horizontally extending drive shaft, a sleeve surrounding each end of said drive shaft and forming part of the traction unit housing, mounting means on said main frame whereby it is assembled to said sleeves and therefore to said traction unit housing, traction wheels mounted at the ends of said sleeves and driven by said drive shaft, a pair of tilting uprights, bearing means whereby said tilting uprights are mounted on said sleeves for tilting movement relatively to said main frame, a platform supported for vertical movement relatively to said uprights, lift and drive sprockets mounted for rotation on said sleeves, lift chains for said platform in engagement with said lift sprockets, a power unit, and drive chains extending from said power unit to said drive sprockets.

BRONISLAUS ULINSKI.